United States Patent [19]
Kish

[11] 3,838,205
[45] Sept. 24, 1974

[54] ELECTRICALLY CONDUCTIVE PIPE COUPLING GASKET

[75] Inventor: George D. Kish, Bradford, Pa.

[73] Assignee: Dresser Industries, Inc., Dallas, Texas

[22] Filed: July 9, 1970

[21] Appl. No.: 56,178

Related U.S. Application Data

[63] Continuation of Ser. No. 866,128, Oct. 9, 1969, abandoned, which is a continuation of Ser. No. 634,714, April 28, 1967, abandoned.

[52] U.S. Cl. ............ 174/84 S, 174/35 GC, 174/78, 277/235 R, 285/369, 285/382, 285/DIG. 11
[51] Int. Cl. ........................................... H02g 15/08
[58] Field of Search.......... 174/84, 84 S, 35 GC, 51, 174/78; 285/382, 369, 348, 340; 277/235; 339/98, 95 R

[56] References Cited
UNITED STATES PATENTS

| | | | |
|---|---|---|---|
| 2,201,372 | 5/1940 | Miller | 285/340 X |
| 2,885,459 | 5/1959 | Pulsifer et al. | 174/35 GC |

*Primary Examiner*—Darrell L. Clay
*Attorney, Agent, or Firm*—Daniel Ruben

[57] ABSTRACT

A gasket member formed as an annular ring to be employed in conjunction with a pipe coupling device. The ring is comprised of a dielectric elastomeric material and includes a distribution of embedded electrically conductive pins which protrude through opposite surfaces of the annular to establish electrical continuity between the coupled pipe and the coupling member.

8 Claims, 15 Drawing Figures

PATENTED SEP 24 1974

INVENTOR.
GEORGE D. KISH
BY Daniel Rubin
ATTORNEY

INVENTOR.
GEORGE D. KISH
BY Daniel Rubin
ATTORNEY

ELECTRICALLY CONDUCTIVE PIPE COUPLING GASKET

CROSS-REFERENCE TO RELATED APPLICATIONS

This application is a continuation of application Ser. No. 866,128, filed Oct. 9, 1969, now abandoned, which in turn is a continuation of application Ser. No. 634,714, filed Apr. 28, 1967, now abandoned.

BACKGROUND OF THE INVENTION

1. The field of art to which the invention pertains includes pipe joints and pipe couplings particularly as directed to gasket members employed therewith.

2. The use of couplings and gaskets therewith for effecting a leakproof joint with coupled pipe sections is well known. It is likewise known to provide for electrical conductivity as where required for continuity in an installation affording cathodic protection to the pipes when subjected to electrolytic action because of soil conditions or the like. Gasket members to effect electrical continuity for these purposes are those of a type exemplified by U.S. Pat. No. 3,259,406. These gaskets and others similarly adapted are widely used and each employs some sort of electrically conductive, usually metallic, element which when the gasket is compressed at the joint makes physical and electrical contact between the pipe sections and the coupling device. However, one problem inherent in these prior type gaskets has been the inability to completely insulate the metallic or its equivalent element from the pipe line contents with which it may not be chemically compatible. Still another problem which has plagued and handicapped these prior art gaskets is a practice common in the piping industry to coat the pipe exterior with such materials as varnish, lacquer, or epoxy in order to afford corrosion protection to the pipe from its environment. Because these pipe sections are frequently bulky and difficult to handle in the field, it is preferable and more economical to precoat the piping with materials of the type mentioned which then permits the pipes to be placed on site without further delay. Each of these coating materials however, have poor electrical properties such that when necessary to provide electrolytic protection to the pipe sections, it has heretofore been necessary to interrupt the precoating in the area to expose the pipe surface where gasket contact is contemplated or alternatively remove the coating partially from these areas before coupling the joint. It can be appreciated that neither of the aforementioned techniques have been well regarded, since it is both costly and time consuming to interrupt the coating either before or after application, while at the same time, it has not been possible to insure that the pipe areas exposed by these prior techniques will not become vulnerable to corrosion attack against which the coating was intended to protect. Thus, pipe surface areas devoid of the coating, however minute when using these prior art devices, have created problems and unwarranted expense to the piping industry.

SUMMARY

This invention relates to a novel gasket member to be employed in conjunction with a pipe coupling or like devices wherein it is desired to establish electrical continuity between the coupled pipe sections and the coupling device. By means of the gasket member of the invention, the problems with regard to both insulation from the line contents and establishing electrical continuity with coated piping attendant in the prior art is overcome with a gasket member which is universally applicable for these purposes without regard to whether or not the pipe surface is exposed or coated. In accordance herewith, the gasket comprises an annular ring (or buttable segments which can be assembled as a ring) of dielectric elastomeric material in which there is embedded a distributed quantity of electrically conductive pins pointed or wedged at their ends and which either before or after the gasket is compressed, protrude outward of opposite gasket surfaces to stab both the pipe and coupling sections. The pins are of a material having relative firmness and by virtue of being sharp at their ends, any coating which may be contained on the pipe exterior is easily penetrated to the piping surface when the coupling is applied. This therefore insures electrical continuity without the added labor expense of removing or interrupting prior coatings and without reduced protection occasioned by excess surface areas devoid of the coating as has been required to insure contact with such prior art gasket devices. At the same time, the pins emerge generally centralized axially with respect to the end faces of the gasket such that when in place they are assured protection against the pipe line contents coming in contact therewith. Because of these features, the gasket member hereof has enhanced versatility since it can be used for coupling purposes without regard to whether the pipe is coated or not and without regard to any adverse affects that could otherwise result from contact between the conductive element and the pipe line contents.

It is therefore an object of the invention to provide a novel improved gasket member with electrical continuity capability when used with couplings and similar pipe utilization devices.

It is a further object of the invention to provide a novel gasket member having electrical continuity capability between a coupled pipe section and a coupling device with a continuity element protectable from the pipe line contents.

It is a further object of the invention to provide an improved gasket member capable of effecting electrical contact with coupled pipe sections in a novel manner without regard to whether or not the pipe periphery contains a corrosion protection coating material.

It is a still further object of the invention to provide a novel gasket member which is both economical to fabricate and install and enjoys enhanced versatility by being able to overcome the difficulties associated with such prior art devices.

DESCRIPTION OF PREFERRED EMBODIMENTS

Figure 1:
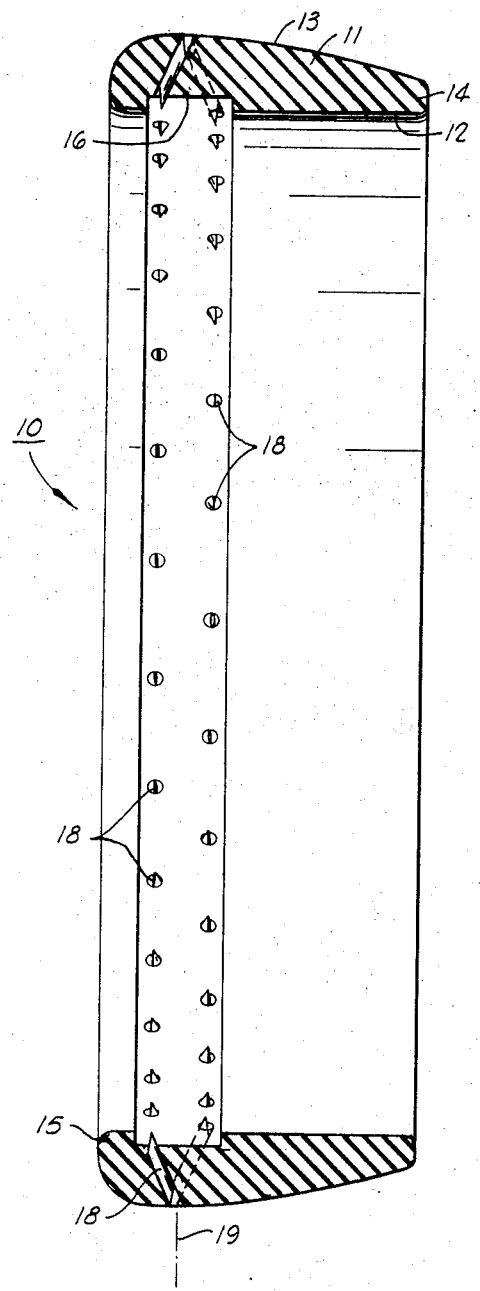
FIG. 1 is an enlarged cross-sectional view through a preferred embodiment of gasket member hereof.
Figure 2:
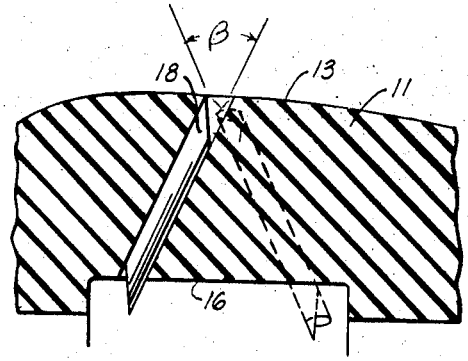
FIG. 2 is an enlarged fragmentary cross-sectional view of the pin arrangement in the embodiment of FIG. 1.
Figure 4A:
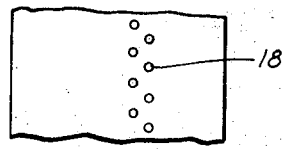
FIGS. 4 a–d are typical partial plan views illustrating the geometrical pin alignment on the pipe engaging surface of the gasket.
Figure 4B:
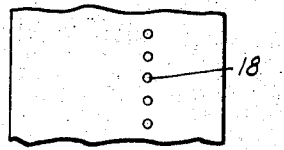
Figure 4C:
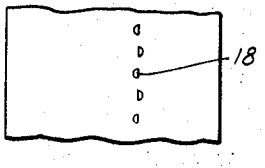
Figure 4D:
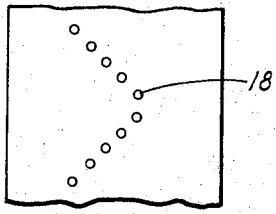

Referring now to FIGS. 1 and 2, there is shown the gasket member designated 10 comprising an annular ring 11 of elastomeric material having generally dielectric properties. Materials suitable for this purpose are by way of example Buna "S" rubber, Buna "N" rubber, natural rubber or other well known synthetics such as polyurethane, Hypalon or Viton, the latter two being Dupont trademarks respectively for chloro-sulfonated polyethylene and polyvinylidiene-hex-chloropropylene. The inside pipe engaging surface 12 of the ring is usually generally flat in transverse section substantially parallel to the ring axis. The exterior surface 13 as will be described below, can be of a variety of geometric configurations suitably adapted for the coupling in which the gasket is to be employed. As shown in FIG. 1, the cross-section through the ring is generally wedge shaped enlarging from its rear end 14 to its forward end 15. As likewise shown in this embodiment, there is provided in the inside surface 12 a radially formed annular recess 16 the inside surface of which need not but can be generally parallel to the ring axis and which is useful for purposes as will be described.

Embedded in the ring 11 is a distributed quantity of electrically conductive pins 18 of metal such as brass or the like which extend substantially from the face of the exterior surface 13 to protrude outward into the recess 16. The pins are sharp on their ends and are arranged alternately staggered with respect to their axial direction, each emanating from a closely common circumferential line 19 at the surface 13 near the forward end of the ring. As can be seen, adjacent pins extend radially but axially diverging with respect to each other generally cross-stitched in an angle $\beta$ of about 30–75° until emerging on penetrating through the inside surface of the recess 16. By terminating in the recess radially beyond the perimeter surface 12, the gasket can be placed on the pipe section without the pins prematurely binding or stabbing therein. The length of the pins are such that when the gasket is in its unused state (before use in a compressed coupling), they may or may not provide through the opposite ring surfaces. When, however, the ring 11 is compressed during application of the coupling, the pins will if not already protruding through the surfaces, emerge into stabbing engagement against both the adjacent pipe surface and the coupling device. Because of the end points, any corrosion coating on the pipe surface is easily penetrated by the pins during compression of the gasket. While circumferential spacing between pins is not critical, it is preferably uniform and is usually in the range of about between one-eighth inch to 1 inch.

With reference to FIG. 3, it can be seen that the shape of ring 11 can typically deviate from the previous cross-sectional embodiment. Also other pin arrangements either singular or plural can be used with or without annular recess 16 and with vertical or angular pin extension between opposite ring surfaces from which they are to protrude. FIG. 4 likewise illustrates in plan different and typical geometric pin alignment patterns protruding at the pipe engaging inside surface 12 of the ring. As stated previously, the preferred combination of ring section and pin arrangement is to a large extent a function of the type coupling to be employed which itself will vary with pipe material, pipe size, piping line contents and the like. Selection may also be a function of the coating material, if existent, which is to be penetrated by the pins to insure a pin density to provide electrical conductivity of capacity sufficient to avoid cathodic damage to the pipe line.

Figure 5:
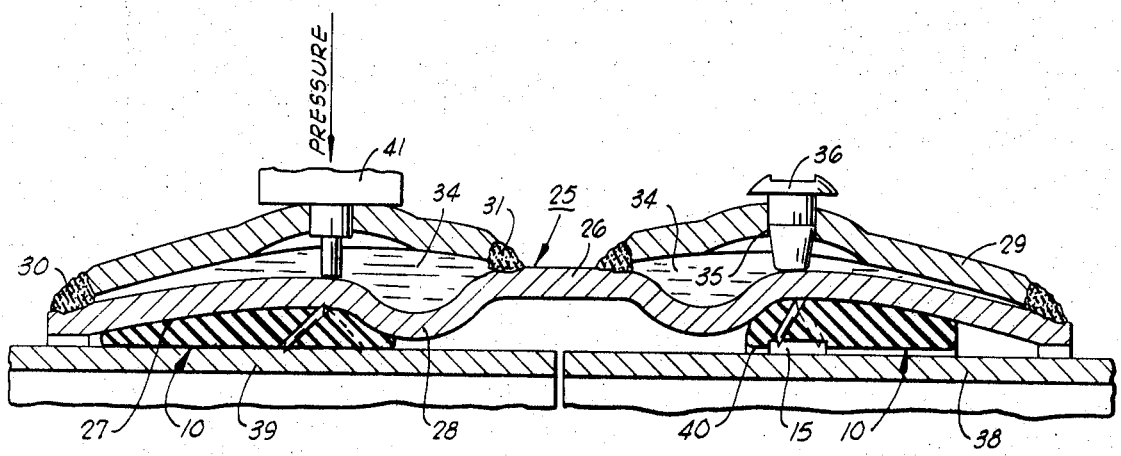
FIG. 5 illustrates a typical coupling use of the gasket hereof.
Figure 3A:
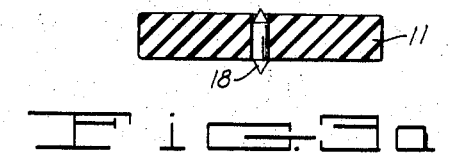
FIGS. 3 a–g are typical cross-sectional configurations in which the gasket member hereof can be formed.
Figure 3E:
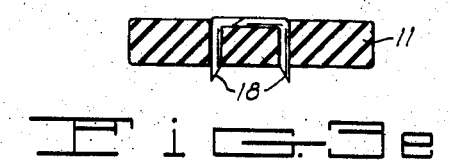
Figure 3B:
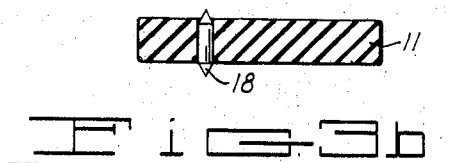
Figure 3F:
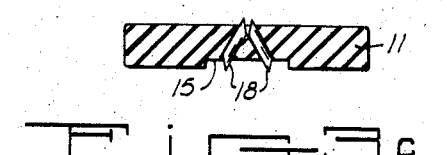
Figure 3C:
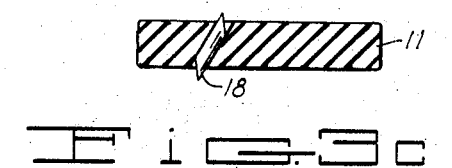
Figure 3G:
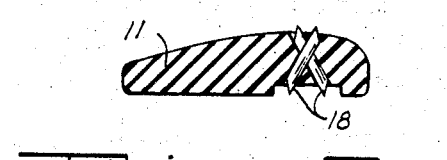
Figure 3D:
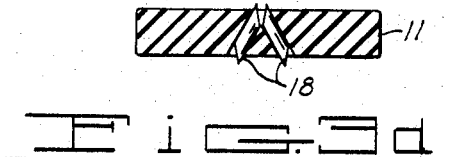

Utilization of the gasket member hereof will now be described by way of example with reference to FIGS. 5 and 6. As shown in FIG. 5, the gasket 10 is employed in conjunction with a coupling member designated 25 of a type disclosed in my copending application, Ser. No. 621,309, filed Mar. 3, 1967, now U.S. Pat. No. 3,429,587. Briefly, the coupling device thereof comprises a tubular shell 26 shaped near each end with an annular arch 27 and an annular corrugation 28 extending radially inward to together define a pocket in which the gasket 10 is contained.

Annularly encircling each end portion of the shell in the vicinity of the gasket is an outer or pressure ring 29 which is joined to the shell along peripheral side edges 30 and 31 by means of welding or the like. The latter ring is wholly or partially arched and generally is formed to extend or span over the arch 27 thereby to define a fluid tight annular passage 34 between the exterior enclosed surface thereat of the shell and the interior surface of the pressure ring. The passage is generally prefilled with a noncompressible fluid such as available forms of automobile grease or the like via a port 35 which extends through the pressure ring into communication with the passage and normally contains a removable plug 36.

Pipe sections 38 and 39 to be coupled are first received within the coupling until enveloped by the gasket member 10 at opposite coupling ends. Thereafter, hydraulic pressure is applied via a hose 41 through one of the ports until the shell at 27 is forged inwardly compressing the gasket in the manner shown in the left portion of FIG. 5. After coupling the first end, the right portion shown unforged is similarly subjected to pressure from hose 41 to complete the joint. As can be seen by comparing the left and right portions of FIG. 5, compression of the gasket eliminates the recess 16 permitting the pins 18 to stab into the pipe wall and in turn into the coupling wall thereat.

Figure 6:
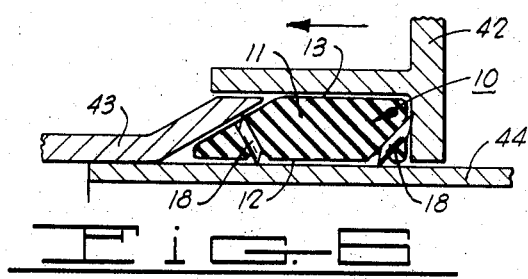
FIG. 6 illustrates a second typical coupling use of a gasket hereof.

In the embodiment of FIG. 6, the gasket member is employed with a coupling of a construction as generally disclosed in U.S. Pat. No. 3,213,187. This type coupling generally employs a follower 42 which is bolt tightened in the direction of the arrow to compress the gasket member 10 between follower 42, middle ring 43, and pipe 44. This causes the pins 18 to effect a stab engagement between the outer periphery of pipe 44 and the coupling components.

By the above description, there has been disclosed a novel and improved gasket member to be employed in conjunction with a pipe coupling device and having enhanced utility where required to provide electrical conductivity as compared to devices used similarly heretofore. By virtue of the uniform distribution of pins in the annulus of the gasket ring, it is possible to penetrate conventional precoatings that may be contained on the pipe surface without the requirement to remove the coating or otherwise expose the pipe surface. This virtue can be better appreciated, when considering that the gasket in accordance with the instant invention achieves a superior more reliable result of effecting electrical conductivity at reduced labor costs when the coupling assembly is applied as compared with such prior art devices. Whereas the gasket has been described as a whole ring of unitary construction, it is not intended to be so limited since it could quite easily consist of two or more buttable ring forming sections for use with well known types of split sleeves for pipe repair. Likewise, it can be shaped and utilized on less than complete pipe encircling engagement as when adopted for use with pipe saddles or the like in which the gasket aperture is generally radial to the pipe axis.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A pipe coupling gasket member comprising:
    a. an endless ring of compressible elastomeric material;
    b. said ring having at least two exterior surfaces, one of said surfaces being a radially inner exterior surface for engagement against a pipe periphery and the other of said surfaces being for engagement against a coupling wall;
    c. said radially inner exterior surface having an annularly extending radial recess pre-formed therein; and
    d. a plurality of individual electrically conductive pins sharp on at least one end and supported embedded within said ring;
    e. said pins extending between the recess of said radially inner exterior surface and said other exterior surface and being of length sufficient when said ring is compressed to protrude outward through both of said exterior surfaces for the protrusion through said radially inner surface to occur with a sharp end thereof penetrating into said recess.

2. A gasket member according to claim 1 in which said recess is located axially intermediate the ring ends.

3. A gasket member according to claim 1 in which said pins are arranged extending generally radial to the ring axis in substantially uniform circular distribution about the annulus thereof.

4. A gasket member according to claim 1 in which at least the predominance of adjacent of said pins are alternately staggered in an axial divergence cross-stitched between common surfaces of said ring.

5. In a coupling device for the joining of pipe including a wall forming gasket recess capable of being constricted in response to an applied force, and a gasket member supported in said recess to receive a pipe therein, the improvement wherein said gasket member comprises:
    a. an endless ring of compressible elastomeric material;
    b. said ring having at least two exterior surfaces, one of said surfaces being a radially inner exterior surface for engagement against a pipe periphery and the other of said surfaces being for engagement against said coupling wall;
    c. said radially inner exterior surface having an annularly extending radial recess preformed therein; and
    d. a plurality of individual electrically conductive pins sharp on at least one end and supported embedded within said ring;
    e. said pins extending between the ring recess of said radially inner exterior surface and said other exterior surface and being of length sufficient when said ring is compressed by constricting of said coupling recess to protrude outward through both of said exterior ring surfaces into opposing engagement between a received pipe and the coupling recess wall for the pin protrusion through said radially inner surface to occur with a sharp end thereof penetrating into said ring recess against a received pipe.

6. In a coupling device according to claim 5 in which said gasket is located axially intermediate the ring ends.

7. In a coupling device according to claim 5 in which said gasket pins are arranged extending generally radial to the ring axis in substantially uniform circular distribution about the annulus thereof.

8. In a coupling device according to claim 5 in which at least the predominance of adjacent of said pins are alternately staggered in an axial divergence cross-stitched between common surfaces of said ring.

* * * * *